US006328320B1

(12) United States Patent
Walski et al.

(10) Patent No.: US 6,328,320 B1
(45) Date of Patent: Dec. 11, 2001

(54) WASTE CONTAINER AND AXLE ASSEMBLY THEREFOR

(75) Inventors: Robert A. Walski, Grandville; Gary L. Kaminski, Alto; Sally L. Moore, Grand Rapids, all of MI (US)

(73) Assignee: Cascade Engineering, Inc., Grand Rapids, MI (US)

( * ) Notice: Subject to any disclaimer, the term of this patent is extended or adjusted under 35 U.S.C. 154(b) by 0 days.

(21) Appl. No.: 09/552,303

(22) Filed: Apr. 19, 2000

Related U.S. Application Data

(60) Provisional application No. 60/130,335, filed on Apr. 21, 1999.

(51) Int. Cl.[7] .......... B62B 1/00

(52) U.S. Cl. .......... 280/47.26; 280/79.5; 301/124.1; 301/111; 220/908

(58) Field of Search .......... 301/124.1, 111, 301/126, 131; 280/47.26, 47.27, 47.33, 47.34, 79.11, 79.2, 79.4, 79.5; 220/908

(56) References Cited

U.S. PATENT DOCUMENTS

| | | | | |
|---|---|---|---|---|
| 3,611,028 | * | 10/1971 | Whitmore . | |
| 4,271,960 | * | 6/1981 | Chalich . | |
| 4,401,312 | * | 8/1983 | Parker | 280/47.26 X |
| 4,674,759 | * | 6/1987 | Parker | 280/47.26 |
| 4,915,436 | * | 4/1990 | Jaus | 301/124.1 |
| 4,977,793 | * | 12/1990 | Husted . | |
| 5,013,170 | * | 5/1991 | Haftmann et al. . | |
| 5,547,104 | * | 8/1996 | Parker | 220/908 X |
| 5,562,989 | * | 10/1996 | Statz . | |
| 5,597,092 | * | 1/1997 | Havlovitz . | |
| 5,716,107 | | 2/1998 | Parker . | |
| 5,743,542 | * | 4/1998 | Mast et al. | 280/47.26 |
| 5,816,591 | * | 10/1998 | Parker et al. | 280/47.34 |
| 5,902,018 | | 5/1999 | Owen . | |
| 6,099,083 | * | 8/2000 | Logan | 301/111 |
| 6,145,856 | * | 11/2000 | Conti | 280/47.26 |
| 6,280,001 | * | 8/2001 | Parker et al. | 301/112 |

* cited by examiner

*Primary Examiner*—Paul N. Dickson
*Assistant Examiner*—Bryan Fischmann
(74) *Attorney, Agent, or Firm*—McGarry Bair LLP

(57) ABSTRACT

A waste container has an axle assembly comprising an axle with opposing axle end caps adapted to mount the wheels of the waste container. The axle comprises a metal rod encapsulated in plastic. An annular axle groove is formed near the ends of the axle in the encapsulating plastic. The metal rod provides the necessary strength for the axle and the encapsulating plastic protects the rod from corrosion while permitting the formation of the annular axle grooves used for mounting the axle to the wheel. The axle can easily be injection molded, reducing the cost and manufacturing time of prior axles while still providing corrosion protection.

33 Claims, 5 Drawing Sheets

WASTE CONTAINER AND AXLE ASSEMBLY THEREFOR

RELATED APPLICATIONS

This application claims the benefit of U.S. Provisional Application No. 60/130,335, filed Apr. 21, 1999.

BACKGROUND OF THE INVENTION

1. Field of the Invention

The invention relates to a waste container with an external axle assembly. In one of its aspects, the invention relates to a waste container with an external axle assembly with opposing end caps for retaining wheels on an axle. In another of its aspects, the invention relates to a wheel assembly, especially for a waste container. In yet another aspect, the invention relates to a method for making an axle assembly.

2. Description of the Related Art

Curbside waste containers with wheels supported by an axle assembly are well known and commonly used in municipal waste collection systems. The wheeled waste containers increase the ease of moving the waste container, which often contains a relatively heavy load, to a curbside where a waste collection vehicle can transfer the contents of the waste container into the waste collection vehicle. Conventional waste containers typically use an external axle assembly incorporating a solid steel axle on which opposing wheels are rotatably mounted. The axles are coated with a rust resistant coating but nonetheless tend to corrode which results in expansion of the axle. The corrosion increases the friction between the axle and the wheels and in some cases freezes the wheels on the axles and can even split the wheels. Further, the solid axles are typically machined to provide mounting grooves and other structural elements for securing the wheel to the axle. The machining of the solid axle and the rust-resistant coating adds to the overall cost of the waste container and increases the manufacturing time of the waste container. Since waste containers are typically high volume items, any small reduction in the manufacturing time and relative cost is a great advantage.

SUMMARY OF THE INVENTION

According to the invention, a waste container for the storage and collection of residential or commercial waste comprising a receptacle having a bottom wall and a peripheral side wall extending upwardly from the bottom wall and terminating in an upper edge to define a waste compartment with an open top. At least one cover is pivotally mounted to an upper portion of the receptacle and is moveable between an open position, in which the cover is remote of the open top to permit access to the waste receptacle, and a closed position, in which the cover at least partially overlies the open top. In a preferred embodiment of the invention, a handle extends from the upper portion of the receptacle. A wheel assembly is mounted to a lower portion of the receptacle and includes an elongated axle, wheels rotatably mounted on the axle, and wheel retainers mounted to end portions of the elongated body outwardly of the wheels to retain the wheels on the axle.

According to the invention, the axle comprises an elongated body formed of a molded synthetic resin; and a reinforcing rod encapsulated within the elongated body to form an internal support therefor and strengthen the elongated body sufficiently to avoid undesirable deformation or failure of the axle under expected loads in the receptacle. In a preferred embodiment of the invention, the elongated body has a groove integrally formed at end portions thereof and the wheel retainers have a lug extending radially inwardly into the groove in the axle to retain the wheels on the axle. In a preferred embodiment, the end portions of the elongated body include a tapered end.

In one embodiment, the grooves extend circumferentially around the end portions of the elongated body and the elongated body is cylindrical in shape. The reinforcing rod preferably extends substantially along the length of the elongated body. In one embodiment, the reinforcing rod is made of metal. In another embodiment, the reinforcing rod is made of fiberglass.

The reinforcing rod preferably extends throughout the central portion of the axle and to the end portions to prevent deformation of the axle between the wheels. However, the central portion of the axle can have molded ribs or other reinforcements formed of the synthetic resin the enhance the strength of the axle and the reinforcing rod need not extend throughout the entire length of the axle. The reinforcing rod can extend to the end of the axle ends of the axle outboard of the wheels but need not do so. The end portions of the axle outboard of the wheels can be formed entirely of the synthetic resin.

The synthetic resin can be a filled or unfilled moldable thermoplastic polymer selected from the group consisting of polyolefins, polyvinyl chloride, Nylon, polyester, acrylonitrile polymers, copolymers, homopolymers and blends thereof. The synthetic resin is corrosion resistant.

The wheel retainers can be a variety of shapes. In a preferred embodiment, the wheel retainers comprise a generally circular spring having a first end attached to the lug to bias the lug into the axle groove. Further, the lug includes a keeper extending radially inwardly toward the axle, and the generally circular spring biases the lug or keeper into the axle groove. Desirably, a cover is mounted to the wheel in overlying relationship with the hub opening to cover the wheel retainer.

DESCRIPTION OF THE PREFERRED EMBODIMENT

Figure 1:
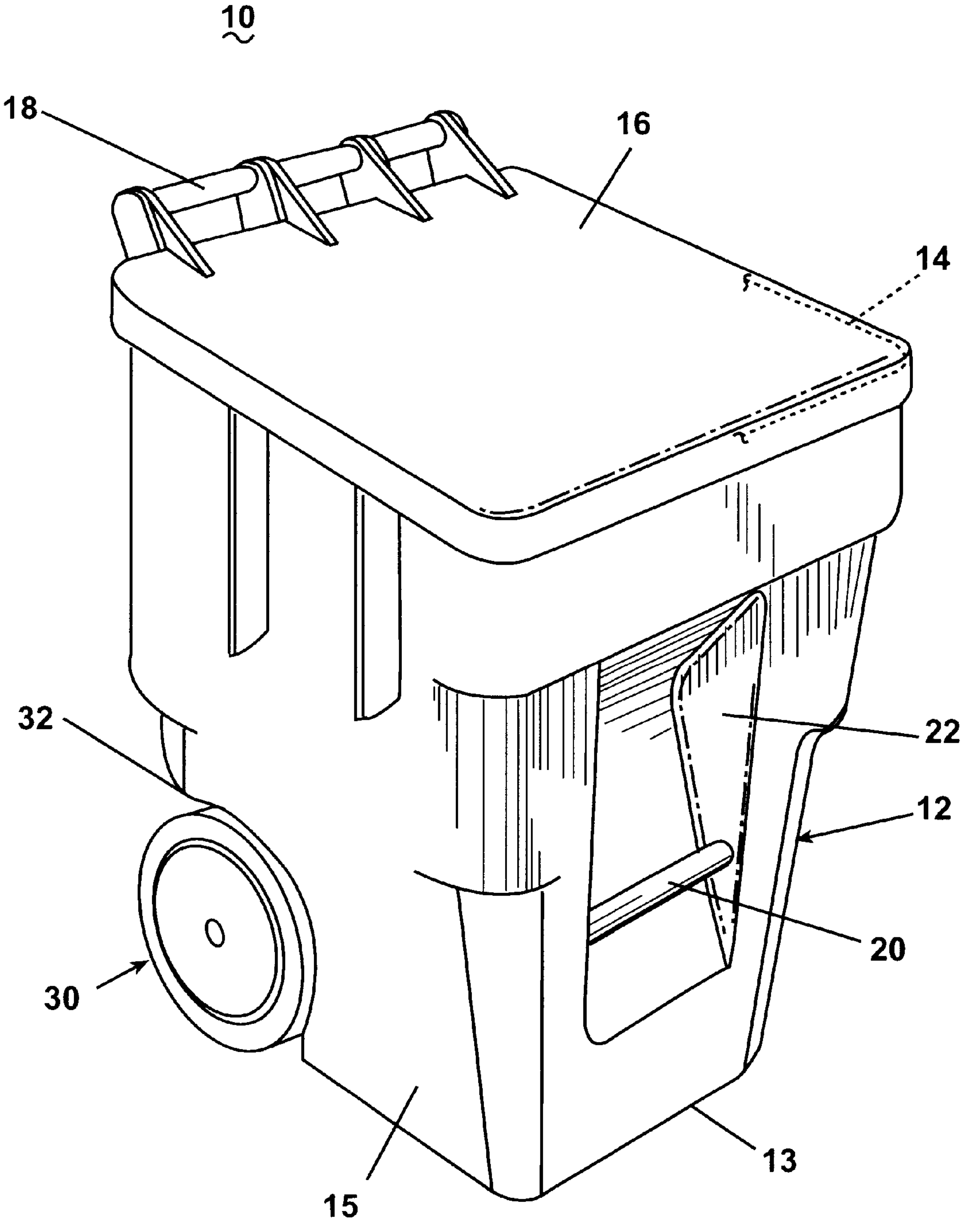
FIG. 1 is a perspective view of a waste container according to the invention and including an axle assembly also according to the invention.
Figure 2:
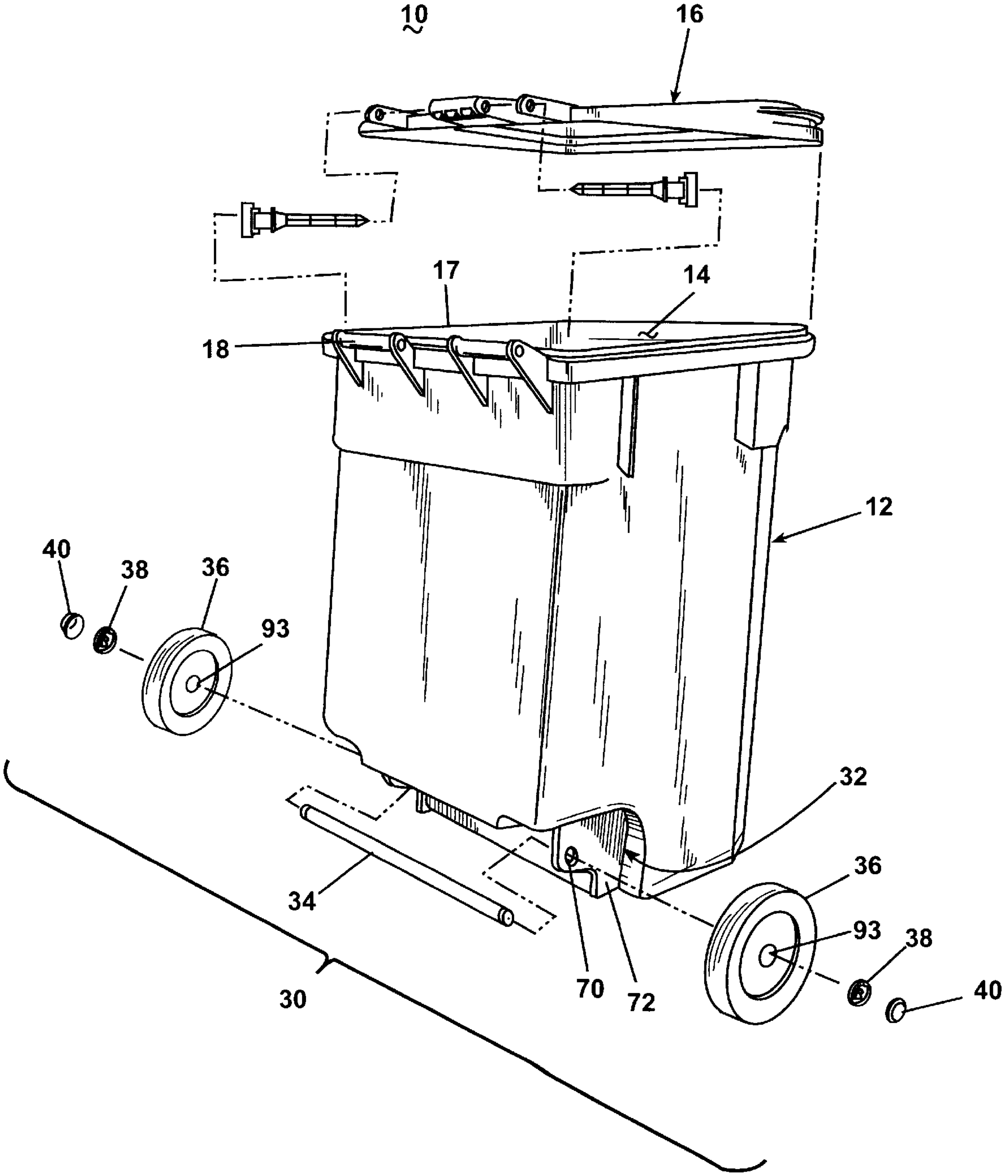
FIG. 2 is a rear view of the waste container of FIG. 1 and showing the axle, fastener, and cover of the axle assembly in exploded view.

FIGS. 1 and 2 illustrate a waste container 10 comprising a body 12 having an open top 14, which is closed by a cover 16. The body 12 comprises a bottom wall 13 from which upwardly extends a peripheral side wall 15, which terminates in an upper edge 17 to define the open top 14. The cover 16 is preferably hingedly mounted to the body 12 via a handle 18 extending from a rear side of the body 12. A grab handle 20 is provided in a depressed area 22 on a front side of the body 12.

Referring to FIG. 2, the waste container 10 further comprises a wheel assembly 30, which is preferably located in an inset portion 32 at the lower rear of the body 12. The wheel assembly permits a user of the waste container to grab the handle 18 and wheel the waste container 10 to a desired location, such as a suitable position for dumping the contents of the body 12 into a waste collection vehicle.

Figure 3:
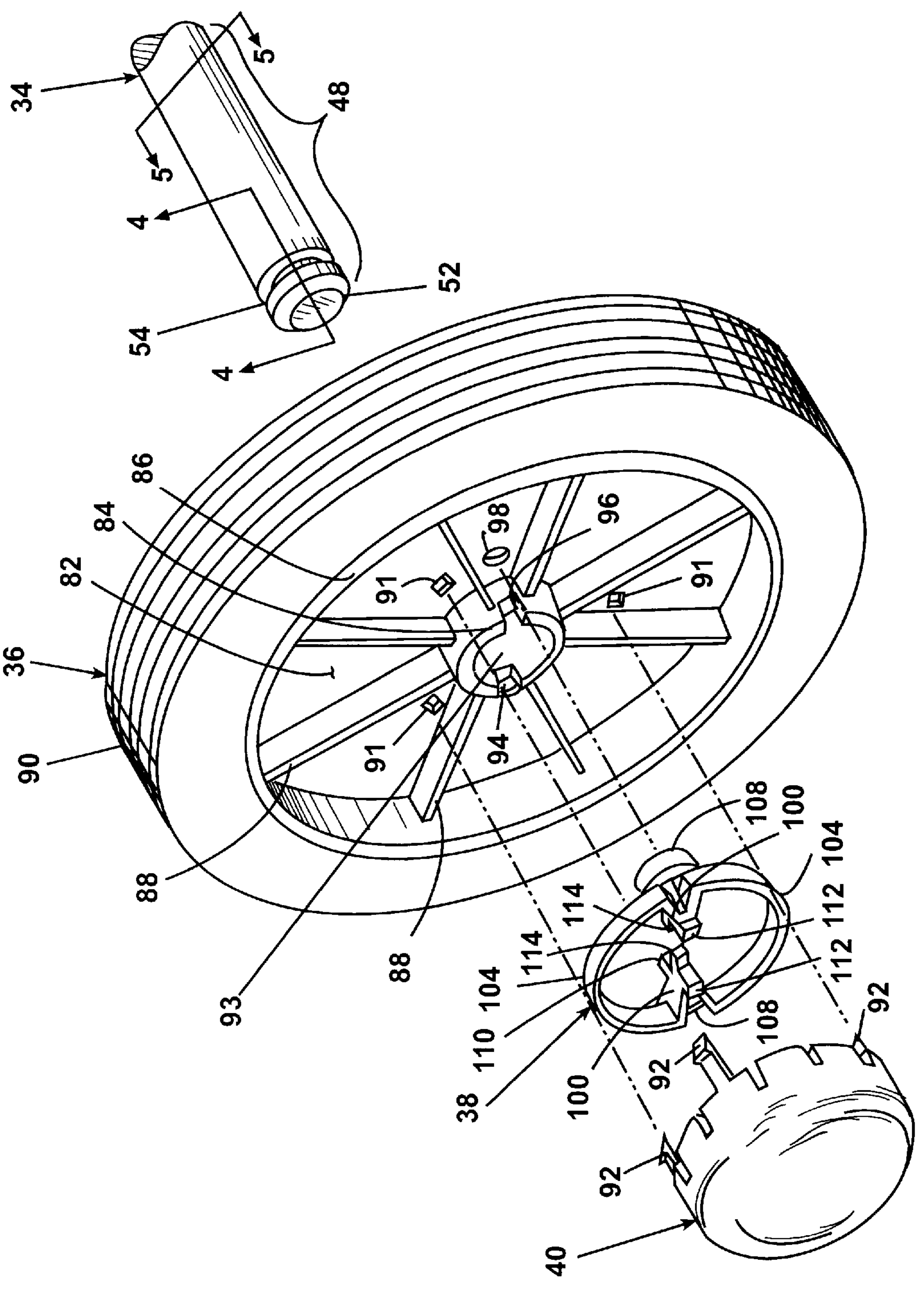
FIG. 3 is an enlarged exploded view of the axle assembly of FIG. 2.

Referring to FIGS. 2 and 3, the wheel assembly 30 comprises an axle 34 for mounting a pair of wheels 36, which are secured to the axle by a retainer or fastener 38 hidden by a cover 40. Each wheel 36 comprises a disc 82, having a hub 84 at the center of the disc and a rim 86 at the periphery of the disc. A plurality of support ribs 88 extend from the hub to the rim 86 to give structural support to the wheel 36. A tire 90 is mounted to the rim 36 of the wheel 36. The disc 82, hub 84, rim 86 and support ribs 88 of the wheel 36 are preferably molded as a single unit from a suitable thermoplastic material. The disc 82 also has four snap apertures 91 to receive snap fingers 92 in mounting the cover 40 to the wheel 36 and disc apertures 98 to provide access for a tool (not shown) to unlock the wheel retainer 38. The hub 84 defines a central aperture 93 of the wheel 36 through which the axle 34 passes upon assembly of the wheel assembly 30. Notches 94 and 96 are located in the wall of the hub 84 and are diametrically opposed to one another.

The fastener 38 secures the wheels 36 to the axle 34 and comprises diametrically opposed lugs 100 connected by two semi-circular spring members 104. The lugs 100 are mirror images of each other. Ring-shaped webs or tool guides 108 extend from the lugs 100 and define tool apertures. Positioning tabs 110 extend away from the tool guides 108 and position the wheel retainer 38 with respect to the disc 82 of the wheel 36. Spacers 112 extend away from the tool guides 108 in a direction opposite the positioning tabs 110. The spacers abut the cover 40 when assembled and locate the wheel retainer 38 between the cover 40 and the wheel 36.

The lugs 100 also have keepers 114, which extend away from the tool guides 108 and toward the center of the aperture defined by the semi-circular springs 104 and lugs 100. Each of the keepers 114 has a beveled surface to aid the insertion of the axle 34 through the lugs 100 upon assembly of the wheel assembly 30. The fastener 38 is disclosed in more detail in U.S. Pat. No. 5,716,107, which is incorporated by reference.

Figure 4:
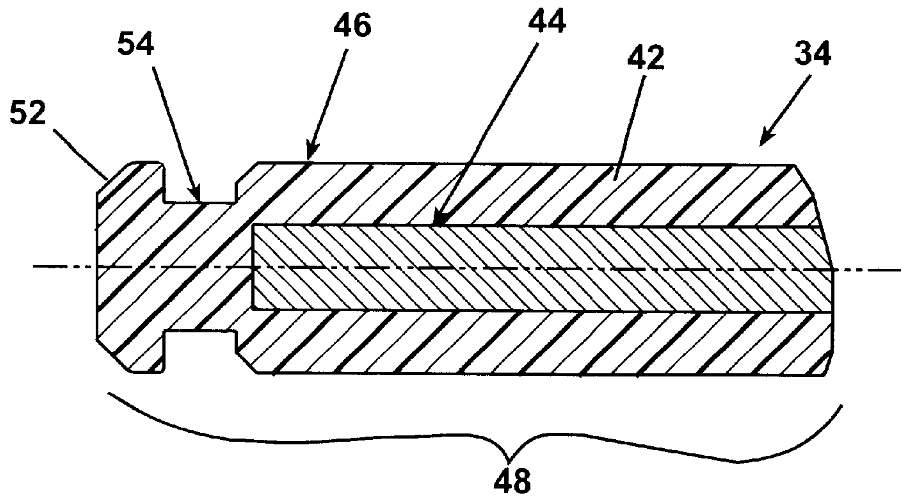
FIG. 4 is a longitudinal sectional view of the axle taken along line 4—4 of FIG. 3 illustrative the internal reinforcing rod and outer layer of the axle.
Figure 5:
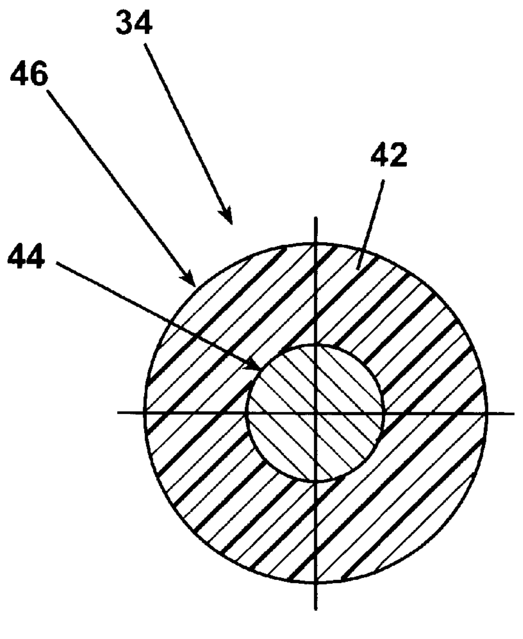
FIG. 5 is a cross section of the axle taken along line 5—5 of FIG. 3.

Referring to FIGS. 3–5, the axle 34 is preferably of a composite construction comprising an elongated body 46 formed of a molded synthetic resin outer layer 42 and a reinforcing rod 44 extending substantially along the length of the elongated body and forming an internal support for the body 46. The internal reinforcing rod 44 is preferably a metal rod, such as steel. However, non-metallic rods, such as fiberglass rods, can also be used. The synthetic resin is preferably a suitable moldable thermoplastic material. The molded synthetic resin is corrosion resistant, is preferably injection moldable and can include a variety of moldable thermoplastic polymers, filled or unfilled, including polyolefins such as polyethylene, polyester, polypropylene, polyvinyl chloride, Nylon, ABS, acrylonitrile polymers, copolymers, homopolymers and blends thereof.

The elongated body 46 comprises a main body 48 and a tapered end cap 52, separated from the main body 48 by an annular axle groove 54. The groove 54 is sized to receive the lugs 100 and/or keepers 114 of the fastener 38. The rod preferably lies in the central portion of the axle as defined by the portion of the axle between the grooves 54.

Although the internal support is preferably a metal rod, other reinforcing rods can be used within the scope of the invention. The internal support can be any structurally suitable element whose structural characteristics are not adversely affected by process of forming the elongated plastic shape. For example, the internal support can be a high temperature plastic or composite material which will withstand the heat of any molding process. The diameter of the rod relative to the diameter of the axle can vary depending on the strength requirement of the container and the overall diameter of the axle. Typically the diameter of the rod will be at least 50% of the thickness of the axle and preferably about 80%. In a specific example, an axle with a diameter of ⅝ inches has a metal rod of low carbon steel of ½ inches and the remainder of the thickness is high impact copolymer polypropylene.

To assemble the wheel assembly 30, the axle assembly 34 is then inserted through opening 70 in support braces 72 located in the inset portion 32 of the waste container body 12. A spacer (not shown) can be slid over the axle to space the wheel 36 from the support brace 72. The resilient fastener 38 is pre-assembled to the wheel 36 along with the cover 40. The assembly of the wheel 36, fastener 38, and cover 40 is then slid over each of the end caps 52 by inserting the end caps 52 through openings 93 in the hub of the wheels. The wheels 36 are slid onto the axle a sufficient distance so that the groove 54 is located on the exterior side of the wheel 36. As the wheel is slid onto the axle 34, the axle end cap 52 abuts the keepers 114 on the lugs 110 and deflects the keepers outwardly against the bias of the springs 104. The continued sliding of the wheel aligns the keepers 114 with the axle groove 54, where the springs 104 bias the keeper 114 into the axle groove 54 to lock the wheel onto the axle assembly 34.

Preferably, the axle is elongated with a circular cross section that forms an overall cylindrical shape. Other cross sections can be used. For example, a multi-faceted cross section, such as triangular, rectangular, pentagonal, or hexagonal can be used. The preferred cross section will be determined by the particular manufacturing process and the anticipated bending forces acting on the axle. For example, a rectangular cross section with a narrow horizontal width relative to the vertical height better resists the bending moments applied to the axle while reducing the material requirement of a circular cross section. The cross section can also vary along the length of the axle. For example, the cross section can be multi-faceted along the central portion of the axle between the support braces 72 and circular along the portion passing through the openings in the support braces 72 to enhance the strength and rigidity of the axle without retarding rotation of the wheels on the axle. The central portion of the axle between the support braces can also have external ribs to enhance the strength and rigidity.

The fastener 38 and cover 40 are the preferred form of the invention but it is within the scope of the invention to include other wheel retainers, with or without end covers. Any other suitable means of retaining the wheel on the axle assembly is within the scope of the invention. For example, a transverse opening through the end caps 52 and a cotter pin or similar locking device can be inserted through the opening to affix the wheel to the axle assembly 34. A cap with deformable fingers extending into the hollow interior of the cap, which is known as a "Timmerman Nut", can also be used. The cap is driven onto the end of the axle and the fingers deform against the exterior of the axle. Also, the fastener can mount to the hub instead of the wheel, preferably by a set of spring fingers that extend from the lug portion of the fastener and are slidably received in a hub opening to bear against a side of the hub opposite the lugs. Such a fastener is show in U.S. Pat. No. 5,902,018, which is incorporated herein by reference.

The grooves 54 need not extend circumferentially around the axle. The groove can be discontinuous as well as continuous. A single or multiple discrete indentations can be used instead of the groove. The continuous nature of the grooves is preferred since only the relative axial movement of the fastener and axle is required to position the lug within the groove, whereas a discontinuous or discrete groove or indentation requires both axial and radial alignment for the lug to be received within the groove or indentation.

Figure 6:
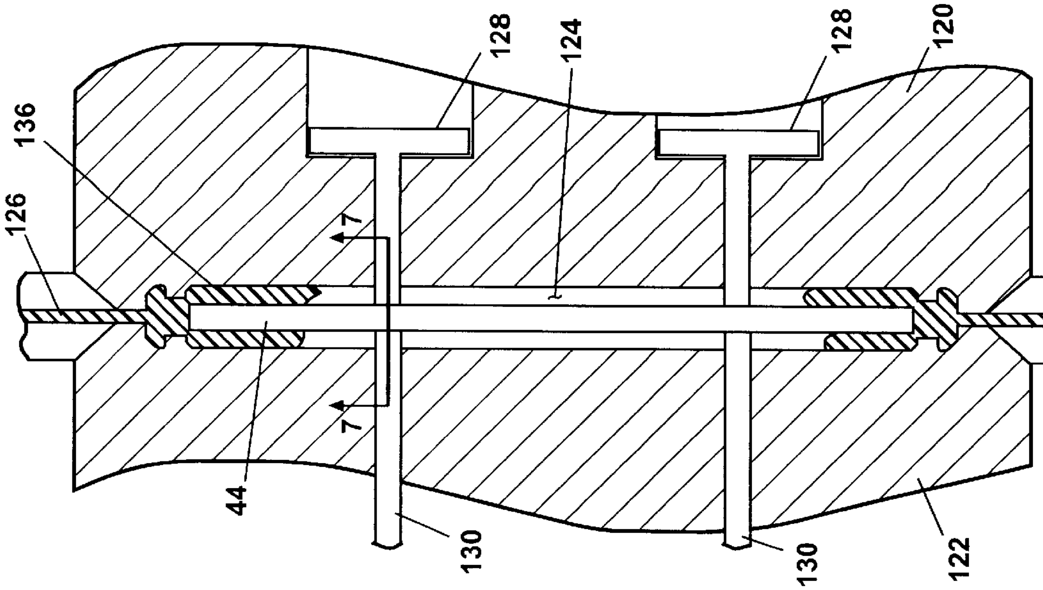
FIG. 6 is a sectional view of an injection mold having a cavity in which the reinforcing rod is held by positioning pins during the initial moments of the injection of plastic forming the outer layer.
Figure 7:
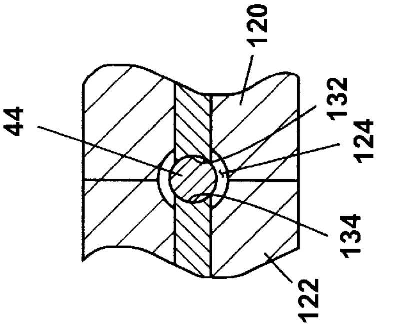
FIG. 7 is a cross section taken along line 7—7 of FIG. 6.
Figure 8:
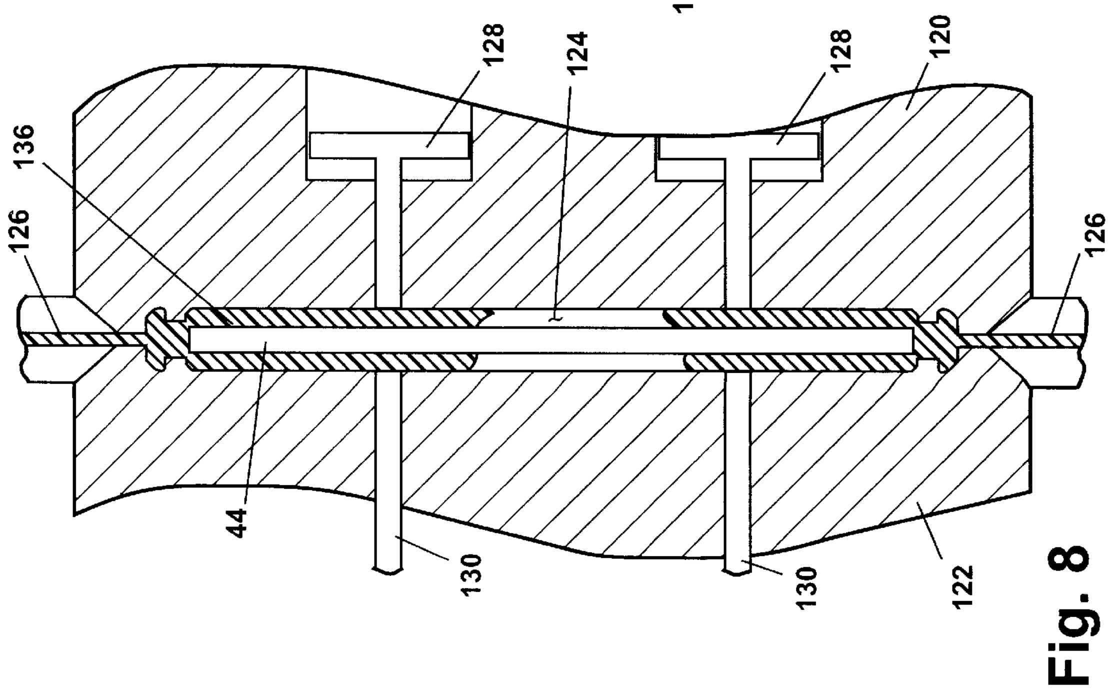
FIG. 8 is a sectional view similar to FIG. 6 with the positioning pins withdrawn from the mold cavity and near the completion of the plastic injection.

Referring to FIGS. 6–8, the axle 34 is preferably made with an insert injection molding process that utilizes a moveable mold half 120 and a fixed mold half 122, which when brought together define a mold cavity 124 defining the exterior shape of the axle. Fluid channels 126 on opposite sides of the mold cavity 124 are formed when the mold halves 120, 122 are brought together. The fluid channels 126 fluidly connect to the mold cavity at the location where the end caps 52 will be formed. A gate (not shown) controls the flow of fluid into the fluid channels 126.

The molds are shown in a vertical orientation with the moveable mold half 120 moving laterally relative to the fixed mold half 122. The mold halves 120, 122 could also be horizontally oriented with the moveable mold half moving vertically relative to the mold half 122.

Positioning pins 128, 130 locate the reinforcing rod in the mold cavity. The positioning pins are located in the upper and lower mold halves 120, 122, respectively, and can be extended and withdrawn from the mold cavity 124. Each of the positioning pins 128, 130 terminate in an arcuate end 132, 134 conforming to the exterior shape of the reinforcing rod 44. When the paired pins 128, 130 extended into the mold cavity 124, they abut opposing sides of the reinforcing rod to compressibly retain the rod with the mold cavity 124.

The molding process is initiated by placing the reinforcement rod 44 on the pins 130 of the lower mold half 122 while the mold halves are separated. The pins 130 can be magnetized to help retain the reinforcement rod 44. The mold halves are then brought together to form the cavity 124 and the pins 128 are extending into the cavity to contact the reinforcement rod 44.

The pins 128, 130 are preferably actuated by air cylinders. However, the pins 128, 130 can be actuated by traditional mechanical devices, such as a cam, or by hydraulic cylinders. The pins function to hold the reinforcement rod 44 in a predetermined position in the mold cavity spaced from the cavity walls and to prevent the rod 44 from deflecting in response to the pressure from the injected plastic. Depending on the bending strength of the material forming the reinforcement rod 44, there can be more than two sets of pins 128, 130. The number and position of the pin pairs 128, 130 can be adjusted as needed. One set of the pins 128, 130 also functions as ejector pins when the molding operation is complete.

When the reinforcement rod 44 is secured within the mold cavity by the pins 128, 130, molten plastic 136 is injected into the mold cavity 124 through the fluid channels 126. Preferably, the molten plastic 136 is simultaneously injected under pressure through the opposing channels 126 moves towards the pins 128, 130. The pins 128, 130 are withdrawn from the cavity 124 prior to the time the molten plastic 136 flow front reaches the pins but after the molten plastic 136 has effectively fixed the position of the reinforcement rod 44 within the cavity 124. The timing of the pin withdrawal can controlled by a timer based on empirical data as to when the molten flow front will reach the pins. Alternatively, the timing of the pin withdrawal can controlled by a pressure sensor which controls the withdrawal of the pins based on the pressure in the mold cavity adjacent the pins.

Although the molten plastic 136 is preferably injected at opposite ends of the cavity 124, the injections can occur at only one of the ends. In a single end injection, the pins 128, 130 can be withdrawn before the approaching front of the molten plastic. The fluid channels also do not need to be at the ends of the axle. The fluid channels and the corresponding gate can extend into the cavity 124 at a position along the side of the axle. For example, a single fluid channel can extend into the cavity 124 between the pin pairs, with the molten plastic flowing from the central portion of the cavity 124 toward the ends.

The injection of the molten plastic 136 continues until the mold cavity 124 is filled to complete the outer layer 42 of the composite axle. When the injection of molten plastic 136 is completed, the mold halves are separated and the axle is removed from the mold. The position pins 130 preferably perform the dual function of positioning the rod and ejecting the rod. When the mold halves are separated, the pins 130 are extended again to eject the completed axle from the lower mold half 122. Traditional ejector systems, including ejector pins, can be used alone or in combination with the positioning pins 130 to eject the axle.

Although the preferred form of applying the outer layer 42 is by injection molding, compression molding and other methods such as coating on the reinforcement rod with molten plastic by dipping can be used.

The waste container 10 according to the invention is an improvement over previous waste containers in that the axle 34 comprises a molded plastic axle that can be easily and inexpensively manufactured and assembled, unlike the solid metal machine axle assemblies of prior waste containers. Additionally, the encapsulating layer of the axle according to the invention is made from non-corrosive material that will not corrode over time, unlike the metal axle assemblies of prior waste containers. Therefore, the waste container and axle assembly of the invention is not only more cost effective and easier to manufacture and assemble than previous axle assemblies, but the axle assemblies according to the invention also will have a longer useful-life than previous axle assemblies.

While the invention has been specifically described in connection with certain specific embodiments thereof, it is to be understood that this description of the invention is by way of illustration and not of limitation. Reasonable variation and modification are possible within the scope of the forgoing disclosure without departing from the spirit of the invention.

What is claimed is:

1. In a waste container for the storage and collection of residential or commercial waste, the waste container comprising:

a receptacle having a bottom wall and a peripheral side wall extending upwardly from the bottom wall and terminating in an upper edge to define a waste compartment with an open top;

at least one cover pivotally mounted to an upper portion of the receptacle and moveable between an open position, in which the cover is remote of the open top to permit access to the waste receptacle, and a closed position, in which the cover at least partially overlies the open top;

a handle extending from the upper portion of the receptacle;

a wheel assembly mounted to a lower portion of the receptacle and including an elongated axle, wheels rotatably mounted on the axle, and wheel retainers mounted to end portions of the elongated axle outwardly of the wheels to retain the wheels on the axle;

the improvement which comprises:

the axle comprises an elongated body formed of a molded synthetic resin; and a reinforcing rod encapsulated within the elongated body to form an internal support therefor and strengthen the elongated body sufficiently to avoid undesirable deformation or failure of the axle under expected loads in the receptacle.

2. The waste container according to claim 1 wherein the elongated body has a groove integrally formed at end portions thereof; and the wheel retainers have a lug extending radially inwardly into the groove in the axle to retain the wheel on the axle.

3. The waste container according to claim 2 wherein the grooves extend circumferentially around the end portions of the elongated body.

4. The waste container according to claim 1 wherein the elongated body is cylindrical in shape.

5. The waste container according to claims 1 wherein the reinforcing rod extends substantially along the length of the elongated body.

6. The waste container according to claim 5 wherein the reinforcing rod is made of metal.

7. The waste container according to claim 6 wherein the synthetic resin is a filled or unfilled moldable thermoplastic polymer.

8. The waste container according to claims 7 wherein the synthetic resin is selected from the group consisting of polyolefins, polyvinyl chloride, Nylon, polyester, acrylonitrile polymers, copolymer and homopolymers and blends thereof.

9. The waste container according to claim 1 wherein the synthetic resin is corrosion resistant.

10. The waste container according to claim 1 wherein the end portions of the elongated body include a tapered end.

11. The waste container according to claim 1 wherein the wheel retainer comprises a generally circular spring having a first end attached to the lug to bias the lug into the axle groove.

12. The waste container according to claim 11 wherein the lug includes a keeper extending radially inwardly toward the axle, and the generally circular spring biases the keeper into the axle groove.

13. The waste container according to claim 12 and further comprising a cover mounted to the wheel in overlying relationship with the hub opening to cover the wheel retainer.

14. The waste container according to claim 1 wherein the synthetic resin is a filled or unfilled moldable thermoplastic polymer.

15. The waste container according to claim 1 wherein the synthetic resin is selected from the group consisting of polyolefins, polyvinyl chloride, Nylon, polyester, acrylonitrile polymers, copolymers, homopolymers and blends thereof.

16. In a wheel assembly comprising an axle with a groove at an end portion thereof, a wheel with a central hub having an opening passing therethrough for receiving the axle, a wheel retainer to retain the wheel on the axle and having a lug extending radially inwardly into the groove in the axle to secure the retainer to the axle, the improvement comprising:

the axle comprises an elongated body formed of a molded synthetic resin and with the groove integrally formed in the elongated body at an end portion thereof; and a reinforcing rod encapsulated within the elongated body to form an internal support therefor and to strengthen the elongated body sufficiently to avoid undesirable deformation or failure of the axle during loading of the axle.

17. The wheel assembly according to claim 16 wherein the elongated body is cylindrical in shape.

18. The wheel assembly according to claim 16 wherein the groove extends circumferentially around the end portions of the elongated body.

19. The wheel assembly according to claim 16 wherein the reinforcing rod extends substantially along the length of the elongated body.

20. The wheel assembly according to claim 16 wherein the wheel retainer comprises a generally circular spring having a first end attached to the lug to bias the lug into the groove.

21. The wheel assembly according to claim 20 wherein the lug includes a keeper extending radially inwardly toward the axle, and the generally circular spring biases the keeper into the groove.

22. The wheel assembly according to claim 21 and further comprising a cover mounted to the wheel in overlying relationship with the hub opening to cover the wheel retainer.

23. The wheel assembly according to claim 16 wherein the synthetic resin is corrosion resistant.

24. The wheel assembly according to claim 16 wherein the synthetic resin is a filled or unfilled moldable thermoplastic polymer.

25. The wheel assembly according to claim 16 wherein the synthetic resin is selected from the group consisting of polyolefins such as polyethylene and polypropylene, polyvinyl chloride, Nylon, acrylonitrile polymers, copolymers, homopolymers and blends thereof.

26. A wheel assembly comprising:

an axle molded of a synthetic resin into an elongated shape with integrally formed wheel retaining indentations at end portions thereof and a reinforcing rod encapsulated within the elongated shape and extending at least along a portion of the elongated shape between the indentations;

a wheel with a central hub having an opening passing therethrough for receiving the axle;

a wheel retainer to retain the wheel on the axle, the wheel retainer comprising a spring and having at least one lug, the at least one lug having a first end attached to the spring and a free end extending radially from the first end, the at least one lug extending radially inwardly toward the axis of the axle into the axle indentation, and the spring biases the lug into the axle indentation.

27. The wheel assembly according to claim 26 wherein the indentation extends circumferentially around the end portions of the elongated body.

28. The wheel assembly according to claim 27 wherein the wheel retainer comprises a generally circular spring having a first end attached to the lug to bias the lug into the axle groove.

29. The wheel assembly according to claim 28 wherein the lug includes a keeper extending radially inwardly toward the axle, and the generally circular spring biases the lug or keeper into the axle groove.

30. The wheel assembly according to claim 29 and further comprising a cover mounted to the wheel in overlying relationship with the hub opening to cover the wheel retainer.

31. The wheel assembly according to claim 26 wherein the synthetic resin is corrosion resistant.

32. The wheel assembly according to claim 26 wherein the synthetic resin is a filled or unfilled moldable thermoplastic polymer.

33. The wheel assembly according to claim 26 wherein the synthetic resin is selected from the group consisting of polyolefins, polyvinyl chloride, Nylon, acrylonitrile polymers, copolymers, homopolymers and blends thereof.

* * * * *